United States Patent
Dell et al.

[11] 3,860,862
[45] Jan. 14, 1975

[54] OPTICAL LINE FOLLOWING PROGRAM CONTROL SYSTEM

[75] Inventors: William Dell, Hamilton, Ontario; Robert E. Parker, Dundas, Ontario, both of Canada

[73] Assignee: Westinghouse Canada Limited, Hamilton, Ontario, Canada

[22] Filed: Jan. 31, 1972

[21] Appl. No.: 222,105

[30] Foreign Application Priority Data
Jan. 29, 1971    Canada............................ 103940

[52] U.S. Cl.............. 318/568, 318/577, 318/609, 318/640, 250/202
[51] Int. Cl. ........................................ G05b 19/42
[58] Field of Search ........... 318/567, 568, 576, 577, 318/578, 600, 601, 629, 640; 250/202

[56] References Cited
UNITED STATES PATENTS

| | | | |
|---|---|---|---|
| 3,004,166 | 10/1961 | Greene | 318/577 X |
| 3,373,267 | 3/1968 | Swann | 318/568 X |
| 3,391,392 | 7/1968 | Doyle | 318/568 X |
| 3,412,289 | 11/1968 | Rosener | 318/629 |
| 3,439,241 | 4/1969 | Martens | 318/601 X |
| 3,463,982 | 8/1969 | Eldridge | 318/629 X |
| 3,668,498 | 6/1972 | Austin, Jr. | 318/568 |

Primary Examiner—T. E. Lynch

[57] ABSTRACT

A line following machine tool control senses marks on the pattern and in response thereto causes changes in the machine tool or tracing function. Provisions are made to avoid inadvertent changes due to pattern defects and cause the line follower to disregard line interruptions.

6 Claims, 15 Drawing Figures 3,860,862

OPTICAL LINE FOLLOWING PROGRAM CONTROL SYSTEM

BACKGROUND OF THE INVENTION

Optical control systems for machine tools have been known for many years. The present invention relates to pattern followers of the type utilizing a circular scan, such as is described in U.S. Pat. No. 3,704,372 issued Nov. 7, 1972.

In many applications the mere following of the pattern is sufficient for the required purposes; that is, of causing the machine tool to reproduce in the metal or material being cut by the machine a path in accordance with the provided pattern. There are, however, situations where further control of the machine may be desirable. For example, when making a number of separate cuts in a single piece of material either by a milling machine, wood router, or even a gas cutting torch, it may be desirable to have a pattern which causes the machine to cut a particular area, stop cutting and then proceed to another portion of the material and cut another pattern and repeat this in several places on the one piece of material, without providing interconnecting cuts between the cut-out portions. In order to accomplish this, it will be evident that, depending on the nature of the tool being controlled, some additional control of the machine tool will have to be provided. In the case of a cutting torch it may be necessary to turn the gas off and on, or in the case of a router; it may be necessary to raise and lower the tool.

SUMMARY OF THE INVENTION

In accordance with the present invention, these objectives are obtained by providing special marks on the pattern which indicate a change of machine tool function. These marks are hereinafter referred to as "command marks." The apparatus is arranged to identify the command marks in such a way that they are not confused with inadvertent marks on the pattern, by ensuring that they must be viewed a specified number of times before they effect the operation. In addition, in order to ensure precise location of the operation, the command marks differ depending upon the operating speed; that is, a command mark which is to be used for high speed operation must be prolonged as compared to a command mark which is required for low speed operation.

The sensing of command marks results in the production of command pulses. Sensing of machine tool positions and conditions also results in command pulses. Command pulses may also be produced manually from the control panel to initiate certain modes of operation. All the command pulses are counted in a counting circuit and the operation of the machine tool is determined by the count at any particular time.

For example, a count of one may indicate the machine tool should commence following the pattern. A count of two may indicate that it should stop. A count of three may indicate that the tool should lower into the work. A count of four may indicate it should proceed following a pattern at a particular predetermined speed. A count of five may indicate that it should again stop. A count of six may indicate that the machine tool should retract. As will be seen from the foregoing, the operation is a sequence-type operation, each pulse causing the next step in the sequence to be performed.

In addition, in order to enable the tool to perform certain desirable functions, the apparatus may be arranged to respond in different ways to discontinuities in the pattern and the sequence previously referred to will determine the response of the apparatus to a gap in the pattern at a particular count.

A clearer understanding of this invention may be had from a consideration of the following description and drawings, in which.

Figure 1A:
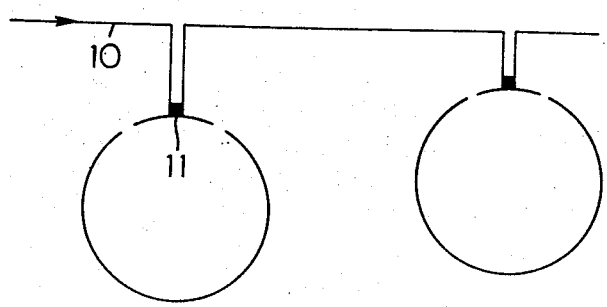
FIG. 1a is a typical pattern to be followed.

Considering first FIG. 1a, let us assume that it is desired to cut two circular patterns from a piece of material by means of a milling cutter. The pattern could consist of a lead-in line 10 during which the pattern tracer follows the pattern rapidly but the cutter is inoperative. On reaching command mark 11, the machine is caused to slow down and proceeds at much slower speed until it comes to the break in the pattern whereupon it turns around and proceeds back along the inside of the line, once more encountering command mark 11. At this point the tool may be lowered and the machine proceeds to cut a path in the material. At the same time, the memory circuit is switched on and when the machine reaches the gap in the pattern again it passes it because the memory causes it to continue on in the same direction in which it was travelling until it once more encounters the pattern. After completing the circle, the machine once again encounters command mark 11. At this point, the machine may be programmed to cut around the circle again at a greater depth if desired, or the memory may be switched out and the tool lifted off the work. Under these latter conditions, on reaching the next gap in the pattern it will turn around the end of the line and proceed up on the outside of the line out of the circular path until it once more encounters command mark 11 at which time it may be switched to high speed and proceed on to the next portion of the pattern where the same operation is repeated. In order to appreciate the manner in which the machine is caused to function in the desired way we will first consider the nature of the scanning system in the previously described optical tracer, U.S. Pat. No. 3,704,372.

Figure 1B:
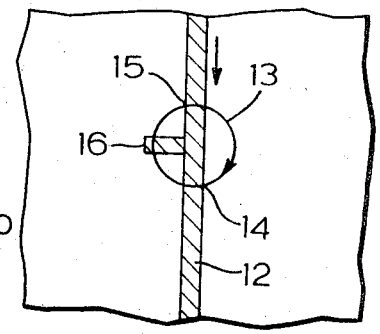
FIG. 1b is a schematic representation of the scan of the tracer.

As will be seen in FIG. 1b, the pattern to be followed consists of a line designated 12. The optical apparatus is arranged to view the pattern in a circular manner and while tracing the line the center of this circle will be over the edge of the line. The circle is designated 13 and represents the path of the scan of the optical system which has a clockwise rotation. When the optical scanner encounters the line at points 14 or 15, it produces a step function. A predetermined time after production of this step function it produces an inhibit pulse which prevents any directional signal from being produced for the majority of the succeeding portion of rotation of the scan. After a pulse is produced at one point the inhibit pulse prevents the next point of intersection from being effective to control the path of movement of the machine.

It will be seen that the scanning circle also intersects the command mark 16. This command mark causes a step waveform at a time when the inhibit pulse has been produced, and therefore this step waveform does not interfere with the normal control of the apparatus. However, it does occur at a time fixed relative to the point 14 and by producing from the waveform produced at 14 a further waveform delayed by 90°, the coincidence of the waveform produced by the mark and the waveform 90° delayed from point 14 may be used to produce a command pulse. In order to prevent faulty operation, a predetermined number of such coincidences must occur before a command pulse is produced.

In the illustration shown, the command mark is the same width as the line. This width is satisfactory if the tracer is tracing at low speed and the command mark is therefore encountered a suitable number of times before the tracer passes it. At high speed it will be necessary to elongate the command mark in the direction of travel to produce the necessary number of coincidences to produce the desired command pulse.

Figure 2:
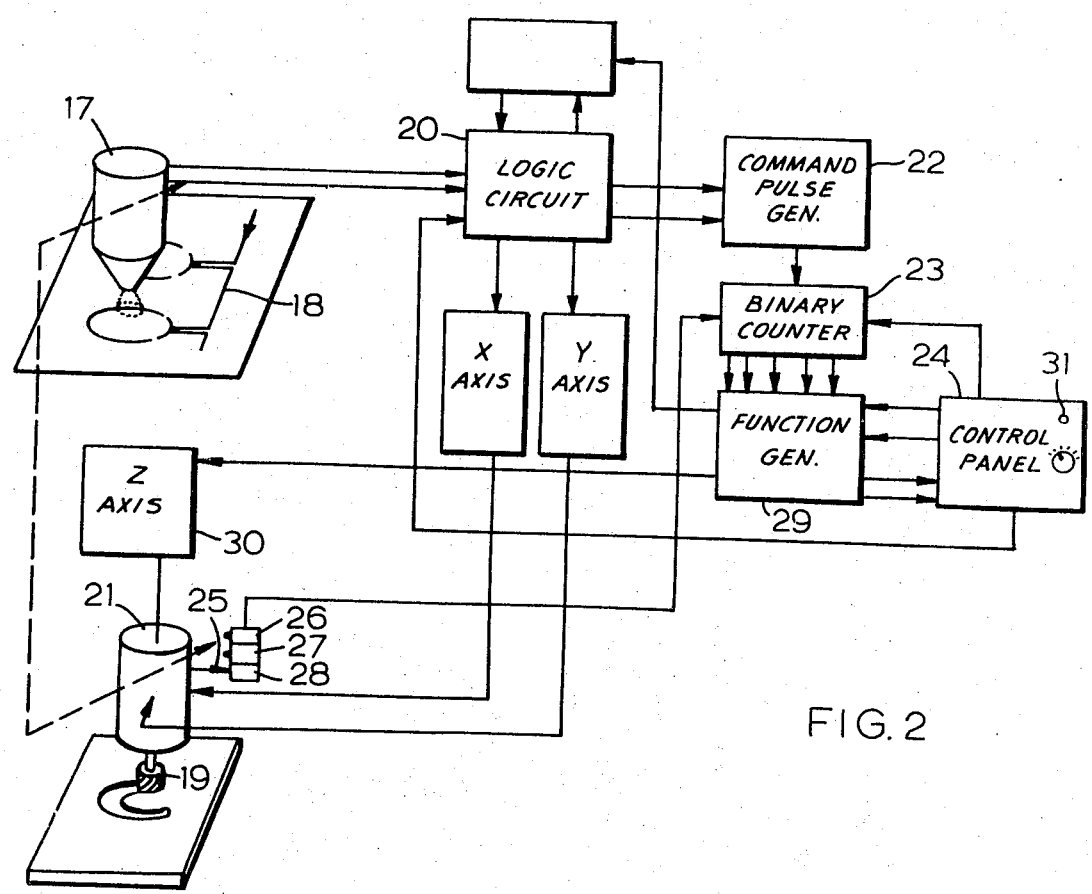
FIG. 2 is a block diagram of the system in accordance with this invention.

Turning now to FIG. 2, there is shown in FIG. 2 a schematic block diagram of a system in accordance with this invention. The system includes an optical tracer designated 17 arranged to trace a pattern 18 and in response thereto cause a cutting tool 19 to follow a similar pattern and cut certain shapes in the material in accordance with the pattern and command marks associated with the pattern. It will be assumed that the optical tracer produces a step waveform every time it encounters an optical discontinuity such as the edge of a line during the course of its circular scan, and produces waveform as shown at a in FIG. 3a. This waveform together with certain reference information is fed into logic circuit 20 where it is processed in a manner more fully described in U.S. Pat. No. 3,704,372, and converted into X and Y coordinate information which is used to position both the cutting tool carriage designated 21, the associated cutting tool 19 and also the optical tracing head 17. In addition, the logic system 20 derives from the incoming signals command signals which are processed by the command pulse generator 22. The output from the command pulse generator 22 is applied to binary counter 23. Also applied to the binary counter 23 is an output from the control panel 24 which is produced in accordance with certain manual operations of the control. Further pulses are supplied to the binary counter from the machine tool carriage 21 when the index 25 on the machine tool carriage is adjacent certain detectors 26, 27 and 28 which detect the position of the index 25. The pulses from these various sources are combined in the binary counter 23 and the count applied to a function generator 29. This function generator produces an output which is dependent upon the particular functions selected by the control panel 24. The output for example may produce different speeds by applying a selectable speed signal to the control panel which normally provides a speed signal to the logic circuit 20. The function generator 29 may also energize the Z-axis drive 30 or activate or deactivate the memory circuit 31 which is coupled to the logic circuit 20. Finally, an indicator 31 on the control panel may be connected to the function generator to indicate the status of the apparatus or the particular stage in a sequence of events which has been reached.

Figure 3:
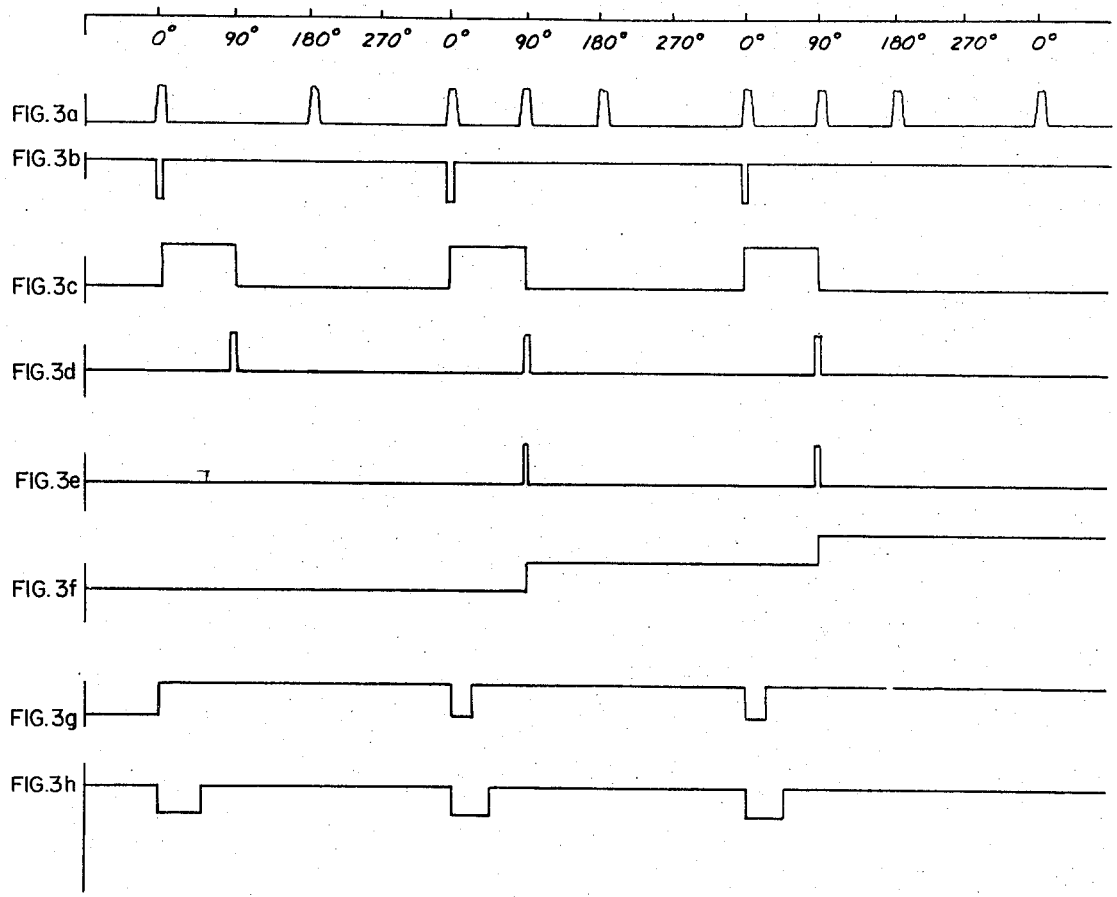
FIG. 3a to 3h are a series of waveforms illustrating the production of the command pulses from the command mark.
Figure 4:
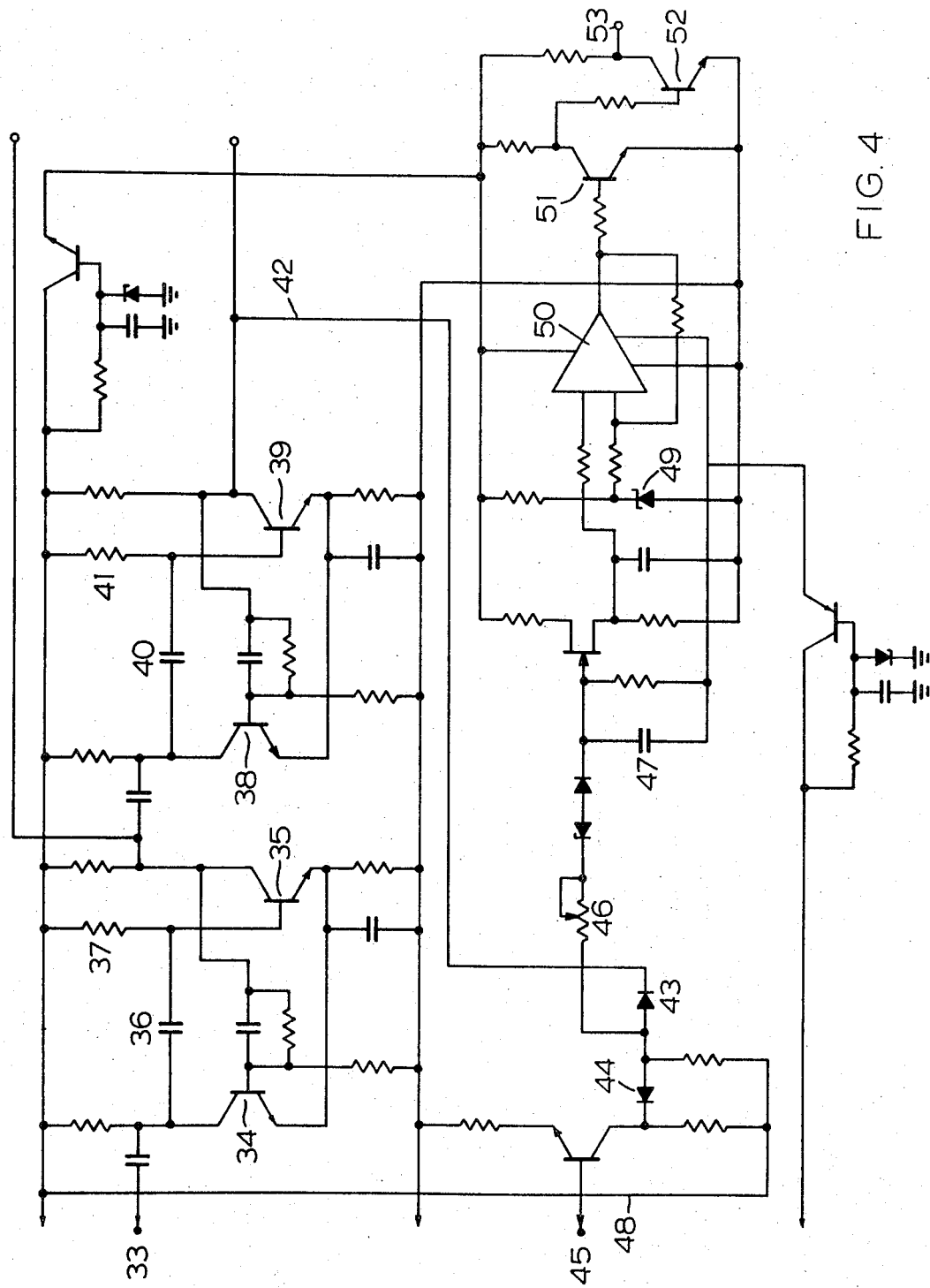
FIG. 4 is a schematic diagram of a circuit for generating command pulses from detected command marks.

Considering now FIG. 4, it is assumed that the optical scanner produces an output as shown at FIG. 3a. In the logic circuit this output is processed and an output corresponding to the waveform shown at FIG. 3b is produced. This output, referred to as a sampling pulse, is applied to terminals 33 of the command pulse generator shown in FIG. 4. Terminal 33 is connected on a monostable circuit consisting of two transistors 34 and 35. The sampling pulse switches this monostable circuit into its unstable condition and after a time determined by the RC network, consisting of capacitor 36 and resistor 37, the monostable circuit reverts to its stable state. The waveform as shown at 3c produced at the collector of transistor 35 is applied to a second monostable circuit consisting of transistors 38 and 39. The falling portion of the waveform causes the bistable circuit to assume its unstable state and after a time determined by the RC constant, consisting of capacitor 40 and resistor 41, it reverts to its stable state. The result is an output as shown at FIG. 3d; that is, a pulse delayed by a time determined by capacitor 36 and resistor 37 from the sampling pulse which time is selected to be equivalent to a 90° rotation of the scan. This pulse appears on conductor 42 and is applied to the coincidence circuit consisting of diodes 43 and 44.

Also applied to the coincidence circuit is a signal similar to that waveform shown at FIG. 3a but inverted which is applied to terminal 45. When both these signals occur on the coincidence circuit at the same time a pulse output as shown at FIG. 3e is applied through variable resistor 46 to capacitor 47 tending to charge it up to the supply voltage available on supply bus 48. The resultant potential on the capacitor 47 is as shown at FIG. 3f. The height of each step and hence the number of pulses required to charge capacitor 47 to a predetermined value may be adjusted by varying resistor 46. The potential on capacitor 47 is applied through a FET, together with a reference potential from Zener diode 49, to comparator 50. When the potential on capacitor 47 reaches the reference potential, an output appears at the output of the comparator 50 and is applied through transistors 51 and 52 to the output terminal 53 and from thence to the binary counter 23.

Figure 5:
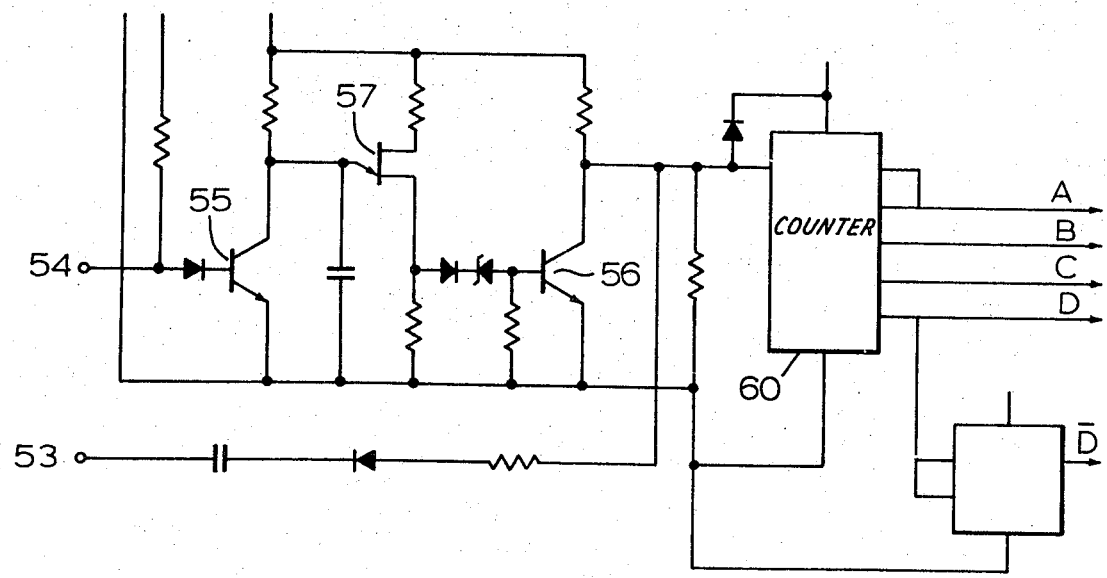
FIG. 5 is a schematic diagram of the command pulse counter.

The binary counter 23 is illustrated in greater detail in FIG. 5. It will be seen that pulse inputs to the counter are applied to terminal 54 and through an amplifier and pulse shaper network including transistors 55 and 56 and unijunction 57. These circuits prevent the counter from responding to inadvertent pulses and noise and ensure consistent shape for the pulses to be counted. The step waveform from terminal 53 is shaped into a pulse by the CR network and appears at the collector of transistor 56. The pulses are then applied to the standard digital counting network designated 60 which has four outputs A, B, C and D and an additional input $\bar{D}$, all of which are applied to the function generator shown in greater detail in FIG. 6.

Figure 6:
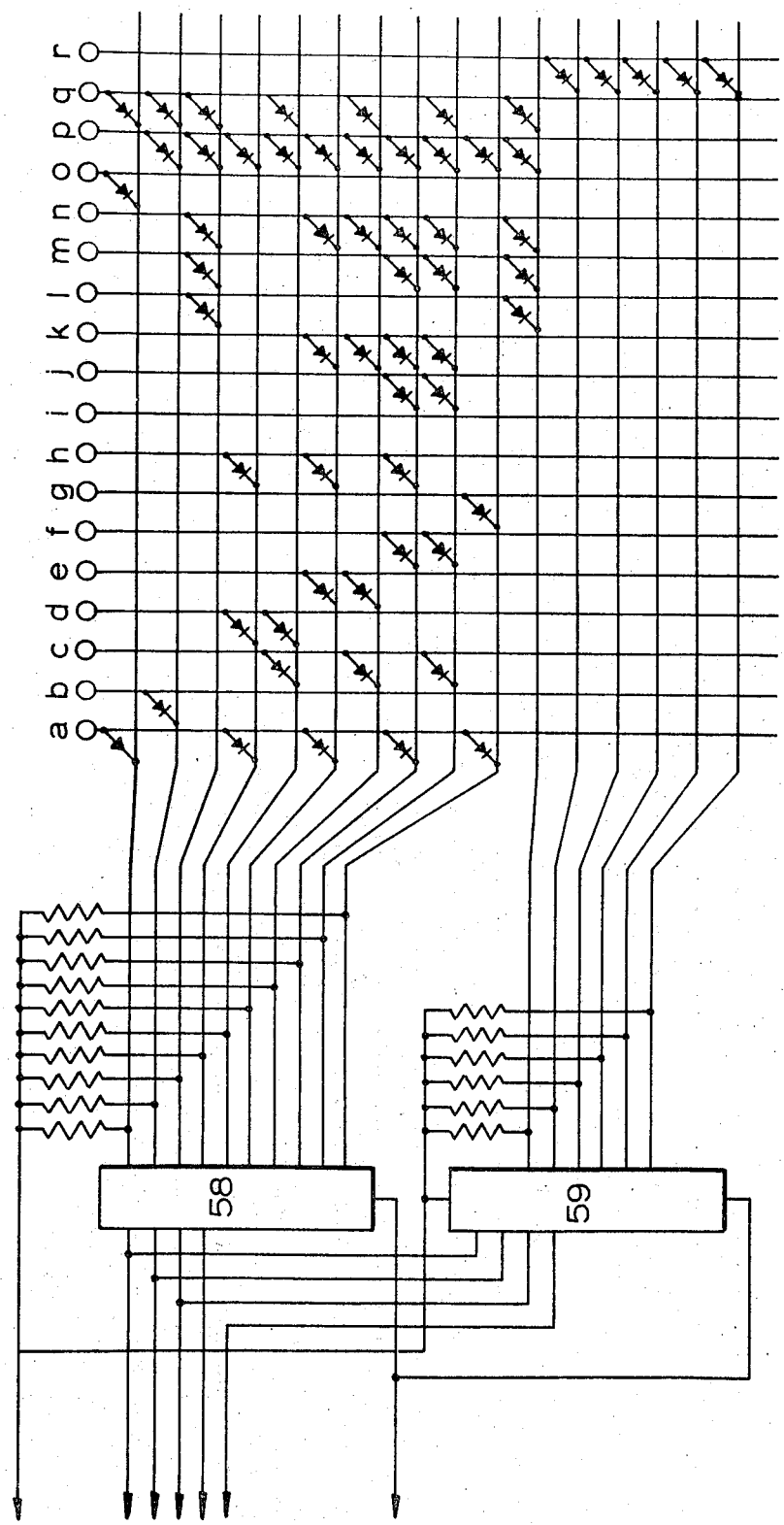
FIG. 6 is a schematic diagram of the function selector or sequencing circuit.

In describing the function generators shown in FIG. 6, it should be understood that the generator described illustrates a particular generator for causing a particular sequence of events in response to a digital count. An apparatus would normally be provided with a plurality of such function generators which could be selectively introduced into the system by operation of the control panel 24. As will be seen, the function generator comprises a digital to decade counting circuit comprising two standard units 58 and 59 which produce an output on one of the output lines in accordance with the digital count applied to the input terminals. The sixteen output lines are connected to the sixteen horizontal lines of a diode matrix. At each of the junctions of a horizontal conductor and a vertical conductor, at which there is shown a darkened circle, a connection is provided in the form of a diode. A potential applied to a horizontal line will produce an output on one or more vertical conductors as determined by the interconnections. An output on a particular vertical conductor causes a particular function to be performed.

Figure 7:
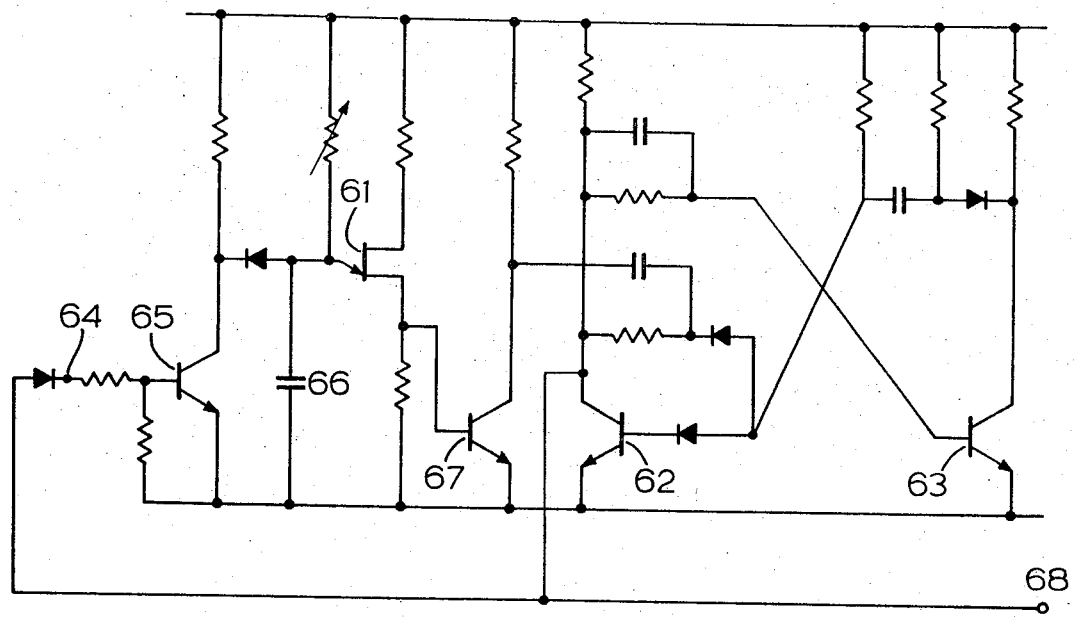
FIG. 7 (which appears on the same sheet as FIG. 5) is a schematic diagram of the memory circuit.

Amongst the various functions that are controlled by the diode matrix is the operation of the memory circuit 31 shown in greater detail in FIG. 7. This memory circuit consists of a unijunction 61 and associated components which together produce a delayed trigger pulse under certain circumstances, and a second portion consisting of a pair of transistors 62 and 63 which together form a monostable circuit driven by the trigger pulse from the first portion of the circuit. In order to understand the operation of the direction memory, let us first consider FIGS. 3a to 3h in which it will be seen that pulses are produced as the line is scanned both in the forward direction at zero degrees and also in the reverse direction at 180°. In order to eliminate the effect of the 180° pulse which would create directional ambiguity in the system, the 180° pulse is rejected by means of an inhibit pulse as shown at FIG. 3g commencing at the time of occurrence of the desired forward pulse which is generated in the logic circuit 20. This inhibit pulse is applied to the input of the delayed trigger circuit at terminal 64. The sampling pulses are of positive polarity and cause transistor 65 to become conductive. If however, because of a gap in the line of the pattern being traced, there is no sampling pulse generated within a predetermined time after the termination of the inhibit pulse, transistor 65 remains cut off and permits capacitor 66 to charge up to the operative level of unijunction 61 causing the unijunction 61 to become conductive and produce a delayed trigger pulse which is applied through transistor 67 to the auxiliary inhibit circuit. This auxiliary inhibit circuit as has been previously indicated consists of a monstable circuit which is driven into its unstable state by the trigger from transistor 67 producing an auxiliary inhibit pulse as shown at FIG. 3h. This auxiliary inhibit pulse which appears at terminal 68 replaces the normal inhibit pulse which would have been produced by the sampling pulse and prevents any signal occurring at the 180° point from effecting the circuit. Therefore, during this period while there are no sampling pulses being produced, no samples are produced and the apparatus continues in its direction in which it is then travelling. The auxiliary inhibit pulse is also seen to be applied to terminal 64 to cause transistor 65 to remain conductive until the auxiliary inhibit pulse terminates. It should be understood that the apparatus is arranged to continue its direction of travel in the absence of sampling pulses in a manner described in the preceding U.S. Pat. No. 3,704,372. If now the line reappears in the forward direction in the area where the pattern may be expected, a forward pulse will be generated in the vicinity of the zero degree mark and will produce a normal inhibit pulse which will occur before the delayed trigger occurs, thus causing transistor 65 to become conductive and discharging capacitor 66 before it has reached sufficient potential to cause the unijunction 61 to conduct. As a result, the delayed trigger will not be generated in the presence of a desired signal.

OPERATION

Let it be assumed that the tracer is of the type described in the foregoing patent U.S. Pat. No. 3,704,372, and it is tracing a pattern as shown in FIG. 1 and the machine has been programmed by means of the diode matrix to lower the cutting tool progressively into the work only in the area of the circular pattern and to hold the cutting tool clear of the work during entry and exit from the pattern. It will be assumed that the tracing head 17 is located over the beginning of the pattern at the front of the drawing, that is, at the bottom of the page as shown in FIG. 2. The operator will operate pushbutton 31 which will apply, in effect, a pulse to the binary counter 23. The binary counter 23 will apply its output in the form of a single count to the function generator which in turn causes a potential to be applied to the second horizontal line of the matrix. It will be seen that this line is connected to vertical conductors having terminals B, P and Q. Terminals B, P and Q may operate various devices; for example, B may introduce a suitable speed signal into the logic circuit to cause the machine to proceed at full speed along the line; Q may energize the indicator lamp to show that the apparatus is tracing. After the machine turns the corner and approaches the rectangular portion of the pattern, it encounters the command mark 11. The output from the logic circuit provides the signals as shown at FIGS. 3a and 3d. The coincidence of the pulse caused by the command mark and a pulse as shown at d results in an output as shown at e which causes the charging circuit to charge up in a step waveform. This is repeated for each scan of the command mark until capacitor 47 reaches the reference potential at which point a command pulse is produced which is applied to binary counter 23. This causes the binary counter to apply a potential to the third line of the diode matrix which energizes vertical conductors having terminals $l$, $m$, $n$, $p$, and $q$ for example. Energization of these terminals may cause the apparatus to proceed at some lower predetermined speed. The apparatus to proceed slowly until it reaches the gap in the pattern at which time it will, because the memory is not operative, turn almost 180° and proceed around the inside of the pattern. It will once again encounter command mark 11. Once again the command pulse generator will produce a command pulse which is applied to the binary counter 23 and this will cause the function generator to energize the fourth horizontal conductor of the diode matrix which may be connected to the vertical conductors having terminals $a$, $d$, $h$, and $p$ for example. Energization of these terminals may result in the coordinate drives being deenergized, that is, a zero speed being applied to the logic circuit. The Z coordinate drive may be energized causing the tool to be lowered to a point predetermined by the detectors 26, 27 and 28. An output from the detector may also cause a pulse to be applied to the binary counter causing it to step on to the next position whereupon it will energize the fifth horizontal conductor of the matrix which could, for example, cause a speed signal to be reapplied to the logic, this speed signal being suitable to cause the machine tool to cut at the desired velocity. It may also reenergize the memory and the apparatus will then trace around the inside of the circular pattern cutting a circular path in the workpiece. This continues until the apparatus once more reaches the command mark at which point it may be caused to stop, lower the tool and then proceed to retrace the pattern once more. The diode matrix may be arranged to cause this to recur a set number of times until on the last occasion the tool is raised, the tracer is operated at low speed and the memory is switched out. In this event, on reaching the next gap in the pattern which is just beyond the command mark 11, it will turn almost 180° and trace around the opposite side of the line and once again encounter the command mark where it may be programmed to proceed at full speed and will then proceed along the interconnecting line to the next repeat of the pattern where the whole procedure is repeated.

Various controls on the control panel may also be used to vary the operation of the system. In particular, a variety of function generators as shown in FIG. 6 may be provided within the apparatus and the various outputs connected into the system in parallel, with their inputs selectively connected to the binary counter. In this way, the control panel can be used to cause the machine to perform a variety of predetermined sequences depending upon the arrangement of the diode matrix and the various connections therefrom. It will also be evident that mere substitution of the diode matrix and its associated decade counter will enable the operator to change the machine program. By suitable construction, this substitution may be very convenient. The whole function generator may be arranged on a single board which may be plugged into suitable terminals in the machine.

While the apparatus has been described with particular reference to a particular type of tracing machine, it will be understood that in general it has applications to various types of pattern followers of the optical type. Various modifications can be made to this system in accordance with the type of tracing apparatus with which it is used and depending on the form of logic available. It will be apparent that some systems will not incorporate a memory and it is quite possible that many apparatuses will not require a Z-coordinate drive, but may alternatively turn a gas supply off and on or control some similar function.

The embodiments of the invention in which an exclusive property or privilege is claimed are defined as follows:

1. A machine tool control system comprising an optical pattern follower including means to sense a pattern and control the machine tool in accordance with the pattern and to sense command marks on the pattern being followed and produce therefrom first command pulses, means on said machine to sense the condition of the work tool of said machine and produce in response thereto second command pulses representative of said condition and substantially identical to said first command pulses, a control panel and means thereon to control the production of further control pulses substantially identical to said first command pulses, means to count all of said command pulses as they are produced and effect predetermined changes in the operation of said control system in response to total count of pulses produced.

2. A machine tool control system comprising an optical pattern follower which cyclically scans an optical pattern and produces therefrom output signals having a time characteristic indicative of the direction of travel of the follower with respect to the pattern, means to suppress the output signals of the pattern follower during the majority of the cycle, and enabling means to enable the production of output signals from the pattern follower for a time period less than one complete cycle at a time during the cycle determined by the occurrence of the immediately preceding output signal and auxiliary means provided to produce a signal similar to the output signal and of a cyclic nature to activate said enabling means even in the absence of an output signal whereby in the absence of production of an output signal due to absence of an optical pattern during any one cycle said optical means is enabled to produce an output signal upon the next succeeding occurrence of the pattern, and further means to enable said optical pattern follower to produce pulses in response to detected marks at a time interval other than the time interval during which the pattern occurs and produce therefrom command pulses, means to count said command pulses and to control the operation of said system in accordance with said count.

3. A machine tool control system including an optical pattern follower with means to differentiate between the optical pattern and further marks on the pattern and produce from said further marks command pulses, means to count the number of command pulses received and produce in response to a predetermined number of command pulses a command signal and means to utilize the command signal to determine the mode of operation of the pattern follower.

4. A machine tool control system as claimed in claim 1 wherein the system is programmed to control the operation of the machine tool and the control system in a series of predetermined modes in sequence according to the pulse count.

5. A machine tool control system as claimed in claim 2 wherein in the absence of an output signal the machine continues to travel in the same direction it was travelling before encountering an absence of an optical pattern.

6. A machine tool control system as claimed in claim 2 wherein the operation of said auxiliary means is determined by a program selected in accordance with the number of command pulses detected by the system.

* * * * *